Figure 1:
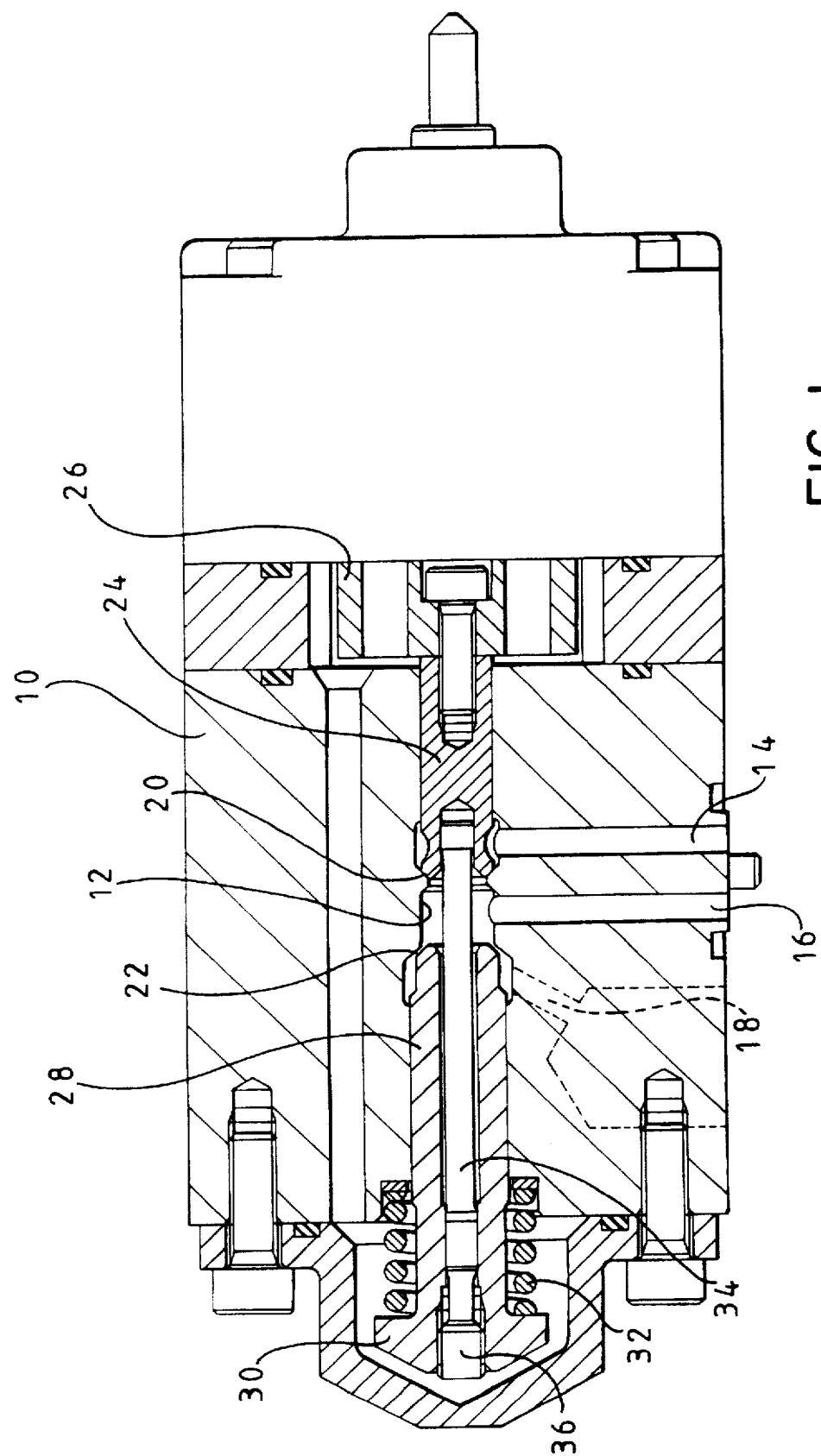

United States Patent
Cooke

[11] Patent Number: 5,787,931
[45] Date of Patent: Aug. 4, 1998

[54] THREE-WAY VALVE FOR A FUEL SUPPLY SYSTEM

[75] Inventor: Michael Peter Cooke, Gillingham, United Kingdom

[73] Assignee: Lucas Industries plc, England

[21] Appl. No.: 603,992

[22] Filed: Feb. 20, 1996

[30] Foreign Application Priority Data

Feb. 21, 1995 [GB] United Kingdom ............ 9503341

[51] Int. Cl.[6] .................. F15B 13/044; F16K 11/14
[52] U.S. Cl. .................. 137/625.65; 137/625.27; 239/585.1
[58] Field of Search .......... 137/625.27, 625.65; 239/585.1

[56] References Cited

U.S. PATENT DOCUMENTS

| | | | |
|---|---|---|---|
| 3,240,231 | 3/1966 | Cadiou | 137/625.67 |
| 3,664,235 | 5/1972 | Walton | 137/625.27 X |
| 3,952,774 | 4/1976 | Loveless | . |
| 4,299,252 | 11/1981 | Reinicke | 137/625.65 X |
| 5,570,721 | 11/1996 | Funke et al. | 137/625.27 X |
| 5,680,988 | 10/1997 | Patil et al. | 137/625.27 X |

FOREIGN PATENT DOCUMENTS

| | | |
|---|---|---|
| 2654035 | 6/1978 | Germany . |
| 2085978 | 5/1982 | United Kingdom . |

*Primary Examiner*—Gerald A. Michalsky
*Attorney, Agent, or Firm*—Andrus, Sceales, Starke & Sawall

[57] ABSTRACT

A valve arrangement is disclosed which comprises a body provided with a bore, first, second and third passages communicating with the bore at axially spaced locations. A valve member is engageable with a first seat to control fluid flow between the first and second passages. A valve element is engageable with a second seat to control fluid flow between the second and third passages. A spring biasses the valve element away from the second seat, and an extensible member interconnects the valve element and the valve member. The valve member is thus biased toward the first seat.

10 Claims, 2 Drawing Sheets

5,787,931

THREE-WAY VALVE FOR A FUEL SUPPLY SYSTEM

This invention relates to a valve arrangement, and in particular to a three way valve arrangement for use in the injection system of an internal combustion engine.

In some diesel internal combustion engines, a single high pressure line or common rail supplies fuel at high pressure to each of the cylinders of the engine, delivery of fuel being controlled by respective valve arrangements. The valve arrangements are commonly in the form of three way valves in which the connection to the cylinder communicates through the valve with the high pressure line in one position of the valve, the connection to the high pressure line being closed in another position, the connection to the cylinder then communicating with a suitable spill arrangement or drain.

A similar valve arrangement is also suitable for use in an accumulator type fuel system in which a single high pressure line from an accumulator communicates with a distributor arranged to distribute the fuel from the high pressure line to the cylinders of an engine, the valve arrangement being provided between the accumulator and that distributor. As in the arrangement described above, the valve arrangement is such that the connection to the distributor is arranged to communicate with either the accumulator or with a suitable spill or drain arrangement.

One disadvantage commonly associated with such valve arrangements is that during switching, direct communication between the high pressure line and the spill arrangement or drain can occur resulting in the injection system operating inefficiently. It is also desirable to be able to obtain fast switching of the valve in order to maximise control over fuel within the system, to provide a valve in which the initial rate of fuel flow from the high pressure line is low resulting in a low initial injection rate, and in which forward pumping of the fuel and operation of the spill or drain arrangement is not restricted.

According to the present invention there is provided a valve arrangement comprising a body provided with a bore, first, second and third axially spaced passages communicating with the bore, the first passage being arranged to communicate with a source of pressurized fuel, the second passage being arrange to communicate with at least one nozzle of an associated engine, and the third passage being arranged to communicate with a suitable drain, a first valve seat provided between the first and second passages, a second valve seat provided between the second and third passages, a valve member engageable with the first valve seat, a valve element engageable with the second valve seat, resilient means biassing the valve element away from the second valve seat, and a resilient, extensible member interconnecting the valve member and the valve element, the resilient means and the extensible member biassing the valve member into engagement with the first valve seat.

Preferably, the extensible member comprises an elastic rod. Alternatively a coiled spring or the like could be used.

Figure 2:
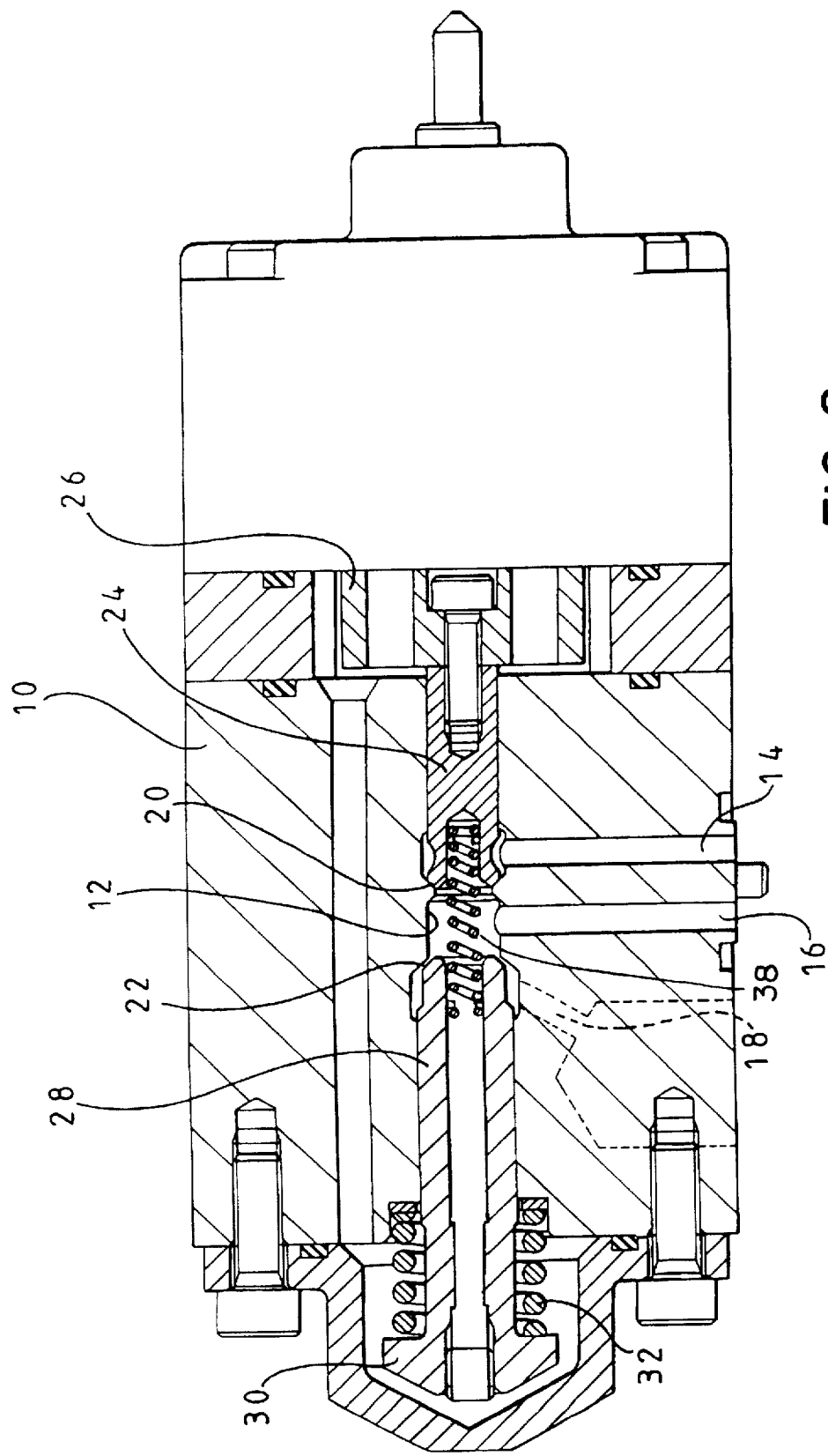

The invention will further be described, by way of example, with reference to the accompanying drawing in which FIG. 1 is a diagrammatic cross-sectional view of a valve arrangement in accordance with an embodiment of the invention and FIG. 2 is a diagrammatic cross sectional view of a valve arrangement in accordance with another embodiment of the invention.

The accompanying drawing illustrates a valve arrangement which comprises a body 10 having a through bore 12 provided therein. A first passage 14 communicates with the bore 12, the passage 14 being arranged to be connected to a source of high pressure fuel. A second passage 16 also communicates with the bore 12, the connection between the passage 16 and the bore 12 being axially spaced from that with the first passage 14. The passage 16 is arranged to be connected to the injection nozzle of a cylinder of an associated engine when used in a common rail system, or alternatively to a distributor which controls communication with the cylinders of an associated engine. A third passage 18 shown in dotted lines in the drawing also communicates with the bore 12, the connection of the third passage 18 to the bore 12 being axially spaced from the connections of the bore 12 with the first and second passages 14, 16.

The surface of the bore 12 is profiled so as to define a valve seat 20 located between the connection of the bore 12 to the first and second passages 14, 16. A second valve seat 22 is provided between the connections of the second and third passages 16, 18 to the bore 12.

A valve member 24 is slidable within the bore 12, a first end of the valve member 24 being connected to the armature 26 of a solenoid such that actuation of the solenoid results in movement of the armature 26 causing the valve member 24 to move within the bore 12. It will be recognised that if the valve member 24 is seated against the valve seat 20, then actuation of the solenoid results in movement of the armature 26 toward the solenoid, and hence in the valve member 24 moving to permit communication between the first and second passages 14, 16.

A valve element 28 is also slidable within the bore 12, an inner end of the valve element 28 being shaped so as to be engageable with the second valve seat 22. The outer end of the valve element 28 which extends out of the body 10 is provided with an outwardly extending flange 30, a coiled spring 32 being arranged to engage between the flange 30 and the body 10 to bias the inner end of the valve element 28 away from the second valve seat 22.

An elongate extensible member 34 is connected to a second end of the valve member 24 which faces the first valve seat 20, the member 34 extending through an axial through bore provided in the valve element 28, a region of the member 34 being provided with an external screw-thread which is arranged to engage with a similar internal screw-thread provided in the bore of the valve element 28. It will be recognised that by rotating the valve element 28 with respect to the valve member 24, and hence with respect to the member 34, the separation between the valve member 24 and valve element 28 can be adjusted. A set screw 36 is provided to lock the member 34 in position with respect to the valve element 28 once the desired relative position has been achieved.

In use, before actuation of the solenoid, the inner end of the valve element 28 is biased away from the second valve seat 22 by the spring 32, the force applied to the valve element 28 being transmitted through the member 34 to the valve member 24 resulting in engagement of the valve member 24 with the first valve seat 20. It will thus be recognised that communication between the first and second passages 14, 16 is prevented, whilst communication between the second and third passages 16, 18 is permitted. Such a position is illustrated in the accompanying drawing, although the separation of the valve element 28 from the second valve seat 22 has been emphasized.

When communication between the first and second passages 14, 16 is required, the solenoid is actuated resulting in a relatively small movement of the armature 26 towards the right as shown in the accompanying drawing. Such movement of the armature 26 results in sliding movement of the valve member 24 with respect to the body 10 separating the end of the valve member 24 from the first valve seat 20, and in the valve element 28 moving against the action of the spring 32 until the inner end thereof contacts the second valve seat 22. It will be recognised that such movement results in communication between the first and second passages 14, 16 and hence in the delivery of fuel to the injection nozzle of the associated cylinder.

The initial movement of the armature 26 towards the core of the solenoid is small. The movement of the armature 26 results in the valve member 24 being separated from the seat 20 by a relatively small amount, and hence a relatively low rate of fuel delivery to the second passage 16. As fuel is delivered, the pressure of fuel within the second passage 16 increases resulting in an increased pressure being applied to the ends of the valve element 28 and the valve member 24 tending to separate the valve element 28 from the valve member 24 thus stretching the member 34, the increased separation resulting in the valve member 24 being lifted further from its seat 20 whilst the valve element 28 remains in engagement with the second seat 22. The increased separation of the valve member 24 from the seat 20 results in an increase in the flow rate of fuel from the first passage 14 to the second passage 16.

When the desired amount of fuel has been delivered, the solenoid is deactivated permitting the armature 26 to return to its normal position. The reduction in the force applied to the valve member 24 due to the deactivation of the solenoid results in the valve member 24 moving towards the first valve seat 20 under the action of the spring 32. The diameter of the second valve seat 22 is greater than that of the first valve seat 20 so that when the solenoid is deactivated, the pressure in the chamber defined between the ends of the valve member 24 and valve element 28 tends to push the valve element 28 away from the second valve seat 22 thereby pulling the valve member 24 into engagement with the first valve seat 20 to break communication between the first passage 14 and second passage 16. Since the valve element 28 is disengaged from the second valve seat 22, fuel within the valve and second passage 16 can escape to the spill arrangement or drain, causing the pressure within the second passage 16 to reduce. As the pressure within the second passage 16 reduces, the member 34 gradually returns to its original length, and hence the valve element 28 gradually moves towards the second valve seat 22, reducing the flow rate to the drain or spill arrangement. The gradual movement of the valve element 28 provides a damping effect, reducing the rate of fall in the pressure of the fuel in the fuel column between the passage 16 and the fuel injection nozzle.

Since the movement of the valve element 28 is small, switching of the valve can occur quickly and thus the transition loss is low. Also, since the opening of the valve between the first and second passages 14, 16 is relatively slow, full movement of the valve member 24 requiring the pressure within the second passage 16 to have built up, the initial injection rate is low. It will further be recognised that since, to a large extent, the movement of the valve member 24 occurs as a result of the pressure of fuel delivered from the first passage 14, the solenoid size can be reduced.

Although in the above described embodiment, an extensible rod is used to interconnect the valve member 24 and valve element 28, it will be recognised that other alternatives are possible. One such possibility is to interconnect the valve member 24 and valve element 28 using a helical spring 38, as shown in FIG. 2.

I claim:

1. A fuel control three-way valve arrangement for use in a fuel system including a source of pressurized fuel, an injection nozzle and a low pressure drain, the valve arrangement comprising a body provided with a bore, first, second and third axially spaced passages communicating with the bore, the first passage communicating, in use, with the source of pressurized fuel, the second passage communicating, in use, with the injection nozzle, and the third passage communicating, in use, with the low pressure drain, a first valve seat provided between the first and second passages, a second valve seat provided between the second and third passages, a valve member slidable within the bore and engageable with the first valve seat, a valve element slidable within the bore and engageable with the second valve seat, resilient means biasing the valve element away from the second valve seat, and a resilient, extensible member interconnecting the valve member and the valve element, the resilient means and the extensible member biasing the valve member into engagement with the first valve seat, the resilient, extensible member being in tension throughout the range of movement of the valve member and the valve element, in use.

2. A valve arrangement as claimed in claim 1, wherein the extensible member comprises an elastic rod.

3. A valve arrangement as claimed in claim 1, wherein the extensible member comprises a coiled spring.

4. A valve arrangement as claimed in claim 1, further comprising actuator means for lifting the valve member from the first seat.

5. A valve arrangement as claimed in claim 4, wherein the actuator means comprises a solenoid actuator including an armature moveable with the valve member.

6. A valve arrangement as claimed in claim 1, wherein the extensible member is adjustably connected to one of the valve member and the valve element.

7. A valve arrangement as claimed in claim 6, wherein the extensible member is adjustably connected to the valve element.

8. A valve arrangement as claimed in claim 7, wherein the extensible member is in screw threaded engagement with the valve element.

9. A valve arrangement as claimed in claim 8, further comprising a set screw for restricting relative angular movement of the extensible member and the valve element.

10. A valve arrangement as claimed in claim 1, wherein a diameter of the second valve seat is greater than that of the first valve seat.

* * * * *